(12) United States Patent
Khojastepour et al.

(10) Patent No.: US 8,467,416 B2
(45) Date of Patent: Jun. 18, 2013

(54) DETERMINISTIC ROTATIONAL CODING

(75) Inventors: Mohammad Ali Khojastepour, North Brunswick, NJ (US); Alireza Keshavarz-haddad, Shiraz (IR)

(73) Assignee: NEC Laboratories America, Inc., Princeton, NJ (US)

( * ) Notice: Subject to any disclaimer, the term of this patent is extended or adjusted under 35 U.S.C. 154(b) by 311 days.

(21) Appl. No.: 12/719,445

(22) Filed: Mar. 8, 2010

(65) Prior Publication Data

US 2011/0007757 A1 Jan. 13, 2011

Related U.S. Application Data

(60) Provisional application No. 61/224,296, filed on Jul. 9, 2009.

(51) Int. Cl.
*H04J 13/00* (2011.01)

(52) U.S. Cl.
USPC .......................................... 370/479; 370/312

(58) Field of Classification Search
None
See application file for complete search history.

(56) References Cited

U.S. PATENT DOCUMENTS

| | | | | |
|---|---|---|---|---|
| 3,925,611 A | * | 12/1975 | Dennis | 380/31 |
| 2006/0265604 A1 | * | 11/2006 | Dirscherl et al. | 713/193 |
| 2009/0225751 A1 | * | 9/2009 | Koenck et al. | 370/389 |
| 2009/0309769 A1 | * | 12/2009 | Au et al. | 341/51 |

OTHER PUBLICATIONS

Avestimehr, A.S. et al., "A Deterministic Approach to Wireless Relay Networks", Proceedings of Allerton Conference on Communication, Control, and Computing, Sep. 2007 (9 pages).

Avestimehr, A.S. et al., "Wireless Network Information Flow", Invited paper, Proc. of Allerton Conference, UIUC, Sep. 2007 (11 pages).

Ahlswede, R. et al., "Network Information Flow", IEEE Transactions on Information Theory, vol. 46, No. 4, Jul. 2000, pp. 1204-1216.

Khojastepour, M.A. et al., "Bounds on Achievable Rates for General Multi-terminal Networks with Practical Constraints", Information Processing in Sensor Networks, Apr. 2003 (16 pages).

Khojastepour, M.A. et al., "On Capacity of Deterministic Relay Networks", 46th Annual Allerton Conference on Communication, Control and Computing (IEEE Allerton), Urbana-Champaign, Sep. 2008, (4 pages).

Koetter, R. et al., "An Algebraic Approach to Network Coding", IEEE/ACM Transactions on Networking, vol. 11, No. 5, Oct. 2003, pp. 782-795.

Li, S. et al., "Linear Network Coding", IEEE Transaction on Information Theory, vol. 49, No. 2, Feb. 2003, pp. 371-381.

* cited by examiner

*Primary Examiner* — David Oveissi
(74) *Attorney, Agent, or Firm* — Joseph Kolodka; James Bitetto

(57) ABSTRACT

A system and method for implementing a network encoding scheme includes buffering a signal in quantized form at a node of a network and permuting the signal into a particular order of code blocks. The code blocks are rotated using at least one key which has been assigned to the node, wherein the at least one assigned key is a value which is used to control the amount of rotation. The rotated code blocks are then combined to generate a combined signal. The combined signal is permuted back to generate at least one output signal.

6 Claims, 5 Drawing Sheets

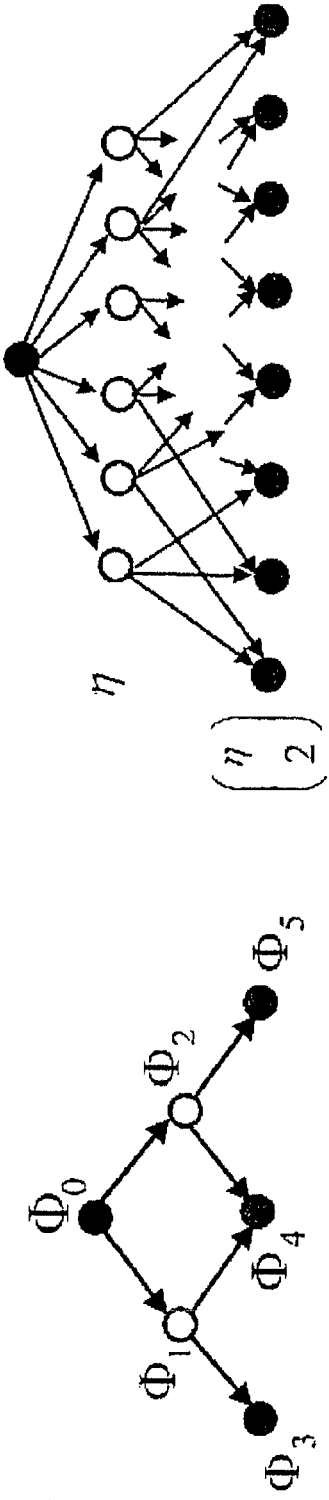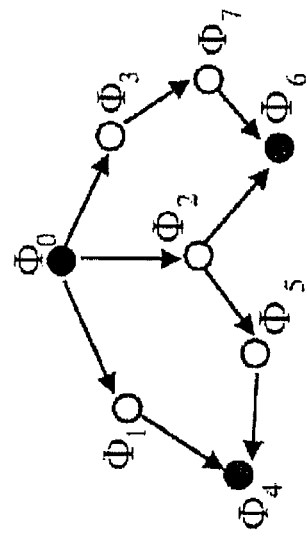
FIG. 5B
FIG. 5C
FIG. 5A

DETERMINISTIC ROTATIONAL CODING

RELATED APPLICATION INFORMATION

This application claims priority to provisional application Ser. No. 61/224,296 filed on Jul. 9, 2009 which is incorporated herein by reference.

BACKGROUND

1. Technical Field

The present invention relates to a network coding scheme, and more particularly, to a rotational coding scheme which can be employed for different network coding applications in wireless or wired networks.

2. Description of the Related Art

In recent years, network coding has become an important research topic in network information theory. It can be used to improve a variety of different performance metrics associated with communication networks. For example, network coding has been used to reduce the energy consumption of a network and delays in a network, as well as to improve the robustness of a network. An ideal network coding scheme maximizes network resources in a manner which achieves the best throughput and quality of service for a given system's resources.

However, many problems arise in developing a network coding scheme which can achieve the best throughput and quality of service. The problems associated with developing such a coding scheme are multiplied when dealing with wireless systems. In addition, techniques for processing received signals in network coding systems often require very long codewords and involve highly complex computations.

Thus, there is a need for a network coding scheme that can achieve optimal throughput and quality of service for the resources of a given system, while minimizing the computational complexity associated with the coding and decoding.

SUMMARY

According to an aspect of the present principles, there is provided a method for implementing a network encoding scheme. The method includes buffering a signal in quantized form at a node of a network and permuting the signal into a particular order of code blocks. The code blocks are rotated using at least one key which has been assigned to the node, wherein the at least one assigned key is a value which is used to control the amount of rotation. The rotated code blocks are then combined to generate a combined signal. The combined signal is permuted back to generate at least one quantized output signal.

According to another aspect of the present principles, there is provided a computer program product comprising for implementing a network coding scheme. The computer program product performs the steps of buffering at least one signal in quantized form at a node of a network and permuting the at least one signal into a particular order of code blocks. The code blocks are rotated using at least one key which has been assigned to the node, wherein the at least one assigned key is a unique value which is used to control the amount of rotation. After rotation, the at least one signal is combined to generate at least one combined output signal. The at least one combined output signal is rearranged to generate at least one quantized output signal.

According to yet another aspect of the present principles, a system is provided. The system includes an analog-to-digital converter for quantizing at least one signal received at a node of a network. The system also includes a storage means configured to buffer the at least one signal, wherein the at least signal is stored in the storage means is rotated using at least one key assigned to a node for controlling a rotation of the at least one signal. A combiner is also included which is configured to combine the at least one signal buffered in the storage means. A digital-to-analog converter is also configured to generate a quantized output signal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5A is a diagram that illustrates an example where the multicast capacity cannot be achieved without increasing the time-slots of linear transfer functions of the nodes.

FIG. 5B is a diagram illustrating an example showing that for any finite T, there exists a network which needs T'>T symbols of as a time-frame to achieve the cutset bound.

FIG. 5C is a diagram that illustrates an example for a half-duplex network where the minimum cutset for two terminals is smaller than the minimum cutset toward each terminal separately.

DETAILED DESCRIPTION OF PREFERRED EMBODIMENTS

Figure 1:
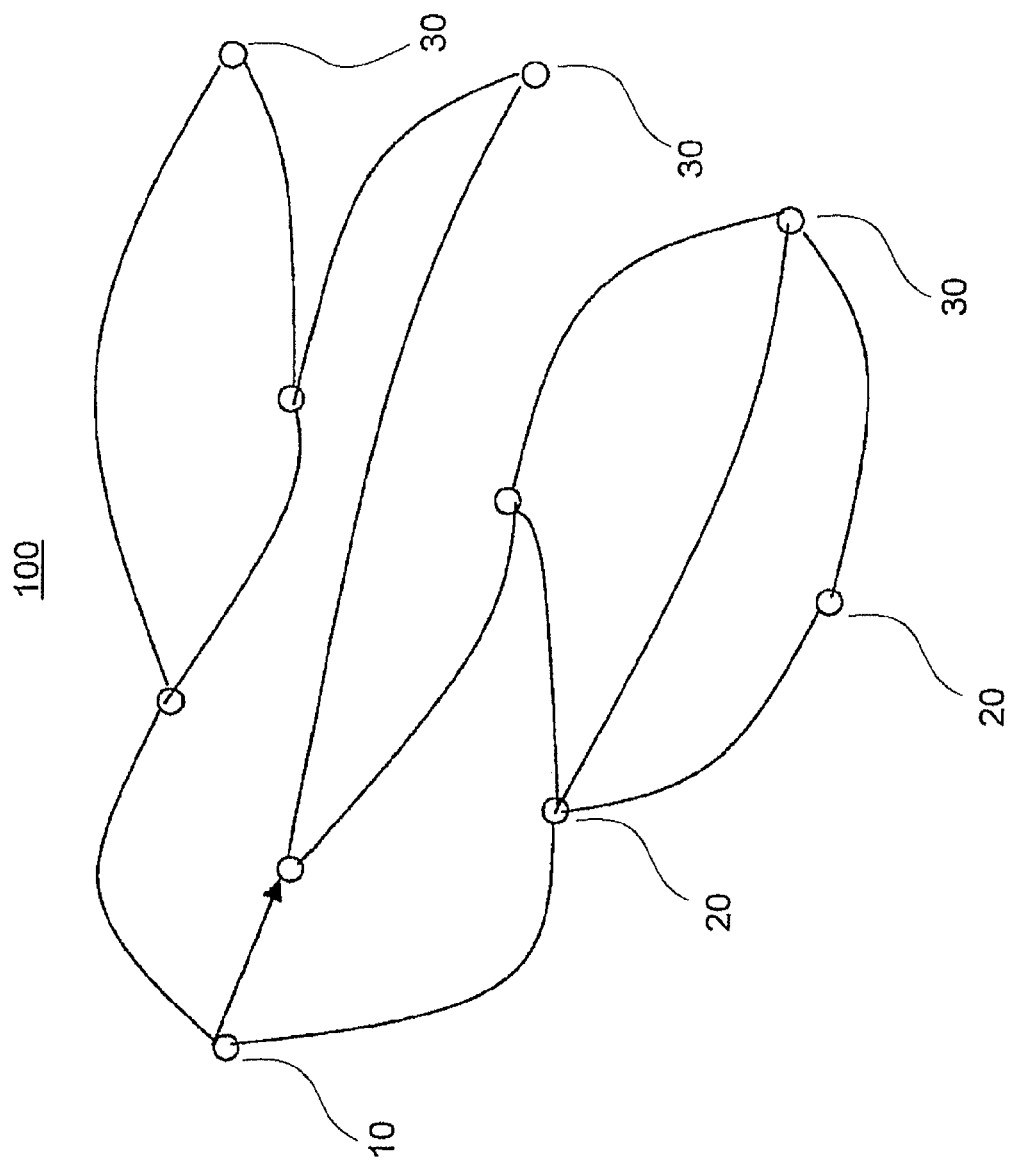
FIG. 1 is a diagram of a wired network on which the present invention could be implemented.

In accordance with the present principles, a rotational coding scheme is provided for use in multi-party communication systems. The rotational coding scheme can be applied in both wired networks (e.g., optical and cable wired networks) and wireless networks, and is able to achieve the minimum cutset bound for a single multicast session in wired networks, layered wireless networks and acyclic wireless networks.

In accordance with the present rotational coding scheme, a codeword length is chosen such that the length of the codeword is long enough to achieve the desired performance. The source node selects a particular location of its transmitted codewords to send pilot signals that are known to the destination nodes. "Keys" are designed and assigned to each node in the network. In a preferred embodiment, the destination nodes have knowledge of all assigned keys, as well as the network topology.

After the source node has transmitted a signal, each intermediate node will quantize the signal if the signal has not already been quantized before transmission. After quantization, each intermediate node buffers the received signal and rotates the signal in accordance with the key which has been assigned to that node. If more than one outgoing channel exists (e.g., in wired networks), then different keys may be used for each channel. Likewise, the component channels may also be assigned different keys. Thus, for each outgoing channel or component channel of a node, a corresponding key can be assigned which is used to control the rotation of that channel before the channel is outputted. Upon receiving the signal from the intermediate node, the destination node decodes the signal using certain parameters such as the keys and the pilot positions.

The rotational coding scheme described herein is an optimal coding scheme that can compete with the state of the art network coding schemes in terms or optimization and performance. Moreover, the computational complexity for coding and decoding is much lower with present scheme when compared to state of the art network coding schemes. As a result, the rotational coding scheme is very applicable for practical uses.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a wired network 100 is illustratively shown. The wired network disclosed is represented as a directed graph with a plurality of nodes interconnected by a series of links. The network includes a single source node 10 which can serve as the source of a multicast session which is being broadcast to the three terminal (or destination) nodes 30. All other nodes are relay (or intermediate) nodes 20 which serve to forward information from the source node 10 to the destination nodes 30. The aforementioned rotational coding scheme may be applied on such a network as described in further detail below. However, it should be noted that application of the present principles is not limited to the wired network disclosed in FIG. 1. Thus, as will be explained below, the rotational coding scheme may be implemented on wireless networks, on networks with half-duplex nodes, and on a variety of other different types of networks or network configurations.

Figure 2:
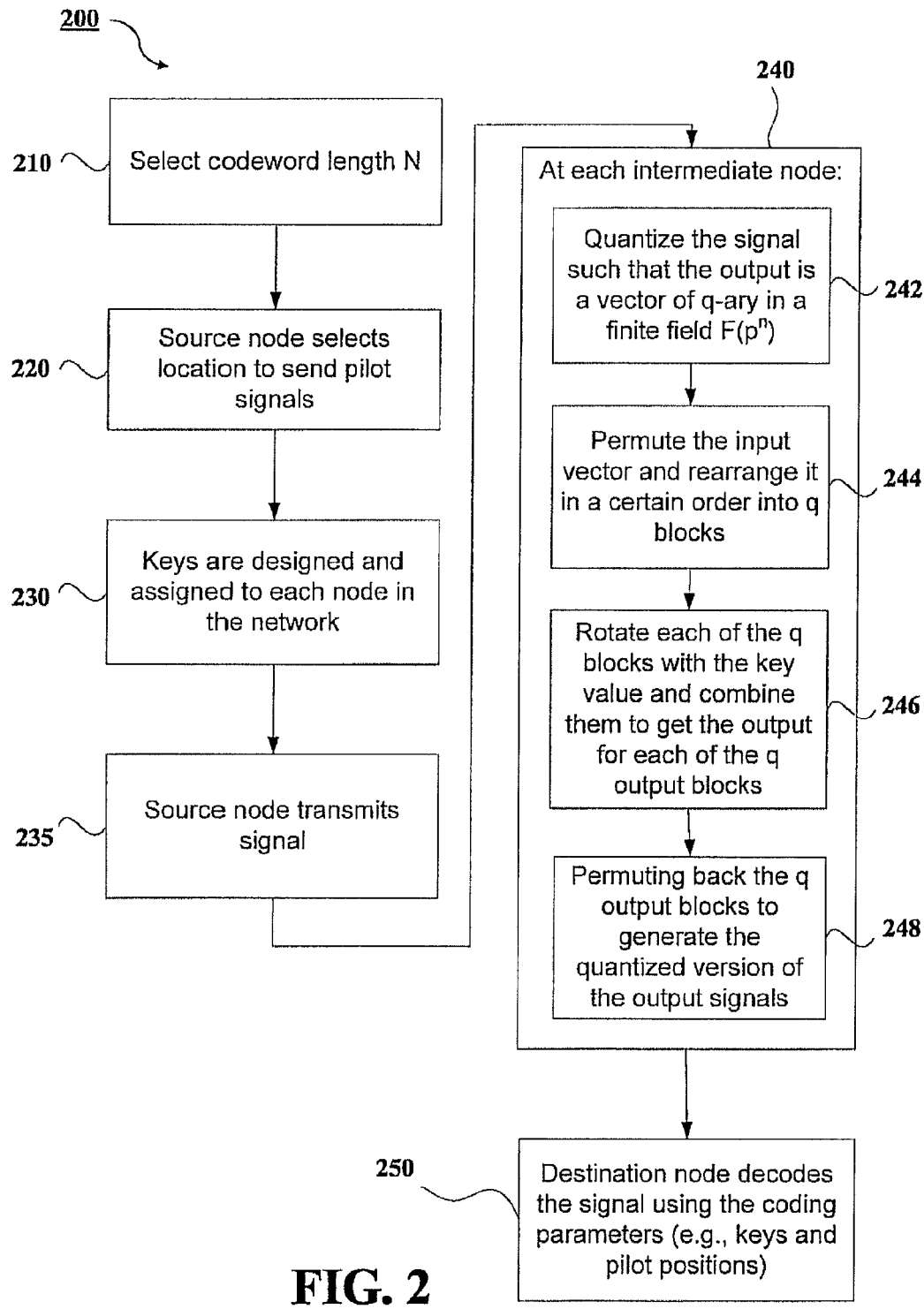
FIG. 2 is a block/flow diagram illustrating an embodiment of the rotational coding scheme in accordance with the present principles.

Referring to FIG. 2 with continued reference to FIG. 1, a block/flow diagram 200 illustratively depicts a method for implementing the rotational coding scheme. In block 210, a codeword of length N is selected by a source node 10, wherein the length of the codeword is selected such that the codeword is long enough to achieve the desired performance. The source node 10 then selects a particular location of its transmitted codewords to send pilot signals that are known to the destination nodes 30 in block 220. In one embodiment, the pilot signals have particular patterns and values, and they are transmitted at the beginning of the frame. The set of pilot signals may be fixed, thus allowing the destination node to estimate the channel between the source and the destination. After the pilot signals have been transmitted, a set of unique numbers, referred to as "keys," are generated and assigned to each node of the network (block 230). The assigned keys are preferably integer numbers which are used to control the amount of shift or rotation by each of the nodes. The keys should be chosen such that the interaction between different nodes leads to maximization of the rank of the decodable space at any subset of nodes (explained below if further detail). In one embodiment, each destination node will have knowledge of all assigned keys, as well as the network topology.

The manner in which these keys are generated can vary. In one embodiment, the set of keys can be generated by a central entity (e.g., the source node) and distributed to the other nodes in the network. In another embodiment, it is possible to assign each node a unique ID number and configure each node to generate the set of keys using a given method and the unique ID assigned to that node. In yet another embodiment, only the key length is set and each node generates the set of keys at random. In addition to those methods already described, other key generation methods may also be employed.

Upon transmission of the signal from the source node (block 235), the signal is received by at least one intermediate node (block 240). The signal is then quantized by each intermediate node into a vector of size q, where each element of the vector belongs to a finite field $F(p^n)$ for some prime number p (block 242). It should be noted that quantization may not be necessary if the source node's transmission is already in quantized form.

After quantization, each intermediate node permutes the input vector and rearranges it in a certain order of q blocks at block 244. Each of the q blocks are then rotated using the assigned key values, and combined (added) to get the output for each of the q output blocks (block 246). In block 248, the q blocks are then permuted back to generate the quantized version of the output signal. The output signal is then forwarded to the destination node which uses the coding parameters, such as the keys and the pilot positions, to decode the signal (block 250).

The manner in which decoding is performed may vary. In one embodiment, the destination node has the knowledge of all the keys used by the nodes in the network and also has the knowledge of the network topology. Thus, the destination node can decode the transmitted codewords using this knowledge. In another embodiment, the keys are not explicitly provided to the destination nodes. In this case a set of pilots are sent and the destination node estimates the channel between the source node and the destination node based on these pilots. The destination node can calculate the effective channel transformation matrix between the source node and the destination node rather than estimating all the keys.

In certain cases, there may be more than one outgoing channel from the intermediate nodes (e.g., in wired systems). If there is more than one outgoing channel, then different keys may be assigned for each channel. Likewise, component channels may also be assigned different keys (e.g., where a node can communicate with another node over more than one channel). Thus, for each outgoing channel or component channel of a node, a corresponding key can be assigned which is used to control the rotation of that channel before the channel is outputted. One example of this scenario is in a wired network where an intermediate node has more than one outgoing link. In this case, to generate the output for each outgoing link, a different set of keys may be employed.

Figure 3:
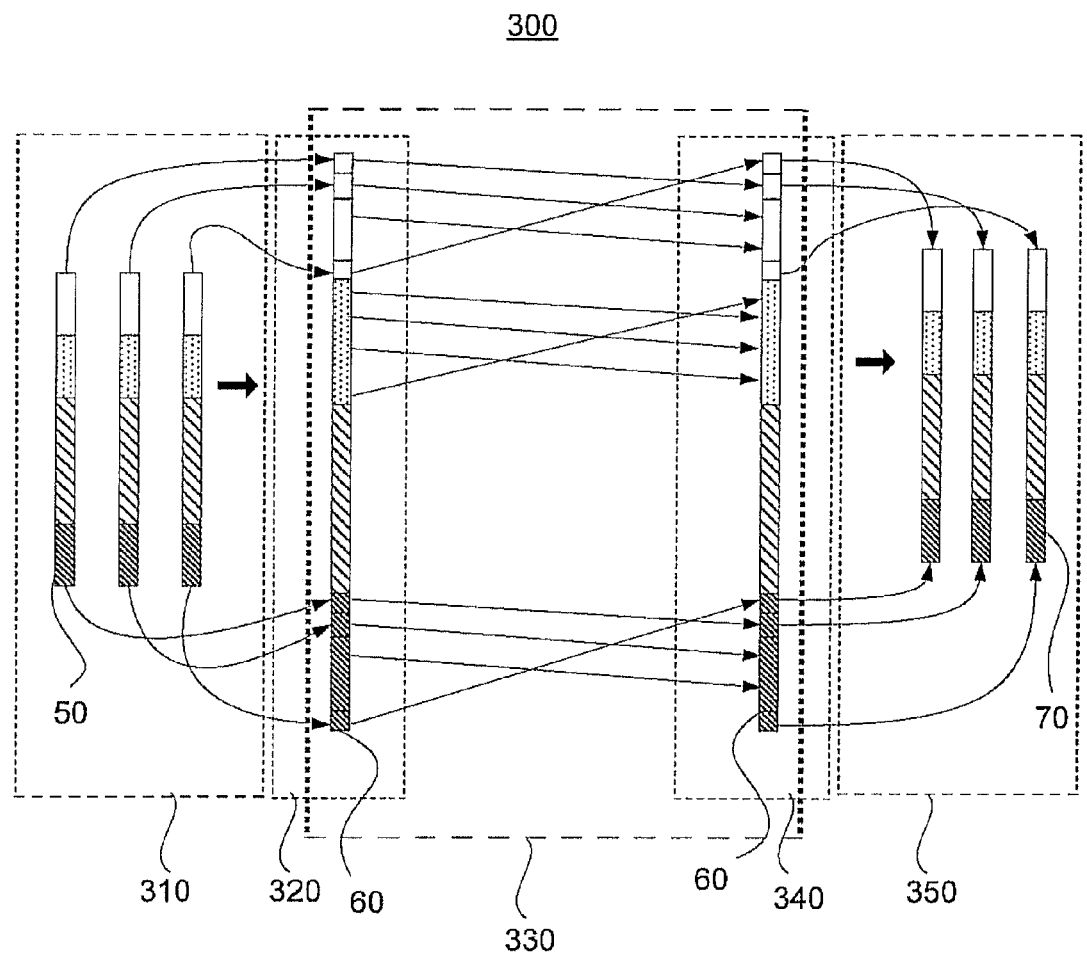
FIG. 3 is a schematic diagram illustrating an application of the rotational coding scheme at a network node.

The schematic 300 in FIG. 3 illustrates a further application of the rotational coding scheme. As can be seen, the schematic is comprised of five blocks, with block 330 overlapping adjacent blocks 320 and 340. The overlapping boundaries represent the fact that the operations performed in block 330 may overlap with the operations in blocks 320 and 340 and/or involve the same hardware.

In accordance with FIG. 3, received signals are quantized using an analog-to-digital converter 50 in block 310. However, as explained above, if the received signals are in digital form, they need not be quantized. The received signals are then forwarded to block 320 where they are rearranged in a certain order into q blocks and buffered into some type of memory storage device 60. This rearrangement can be hardwired, can be accomplished using a digital switch, or may be implemented in software.

Next, in block 330, rotational coding is applied such that each of the q input blocks is rotated using the key values. The rotation of the input blocks is represented by the arrows. The rotation of the signals may be implemented in software, or can alternatively be implemented using hardware such as a shift register or rotator, which is configured to rotate a stored signal. In this particular example, there are four separate signals being buffered, wherein the signals are indicated by the different patterned sections of memory storage device 60 (e.g., shift registers) in block 320. Rotational coding can be separately applied to each subsection or subblock of the buffered signal and each subsection or subblock of the signal may be rotated with a different key. After the q code blocks in 320 have been rotated, the resulting q blocks are combined (e.g., added together in the same field) in block 330 to produce one the q output blocks in 340. Other blocks in 340 are also obtained with similar operation but with different keys. The memory storage device 60 in block 340 corresponds to the same type of the memory storage device used in block 320, except for the fact that the storage device in block 340 contains the q code blocks after they have been rotated by the key value. The rearranged signals are then permuted back in block 340 to produce the vectors in 350. This rearrangement can once again be hardwired, can be accomplished using a digital switch, or may be implemented in software. Finally, in block 350, the analog version of the output signals are generated by using a digital-to-analog converter 70, or, if the transmitted signals do not need to be analog, they can be transmitted without using the digital-to-analog converter.

Figure 4:
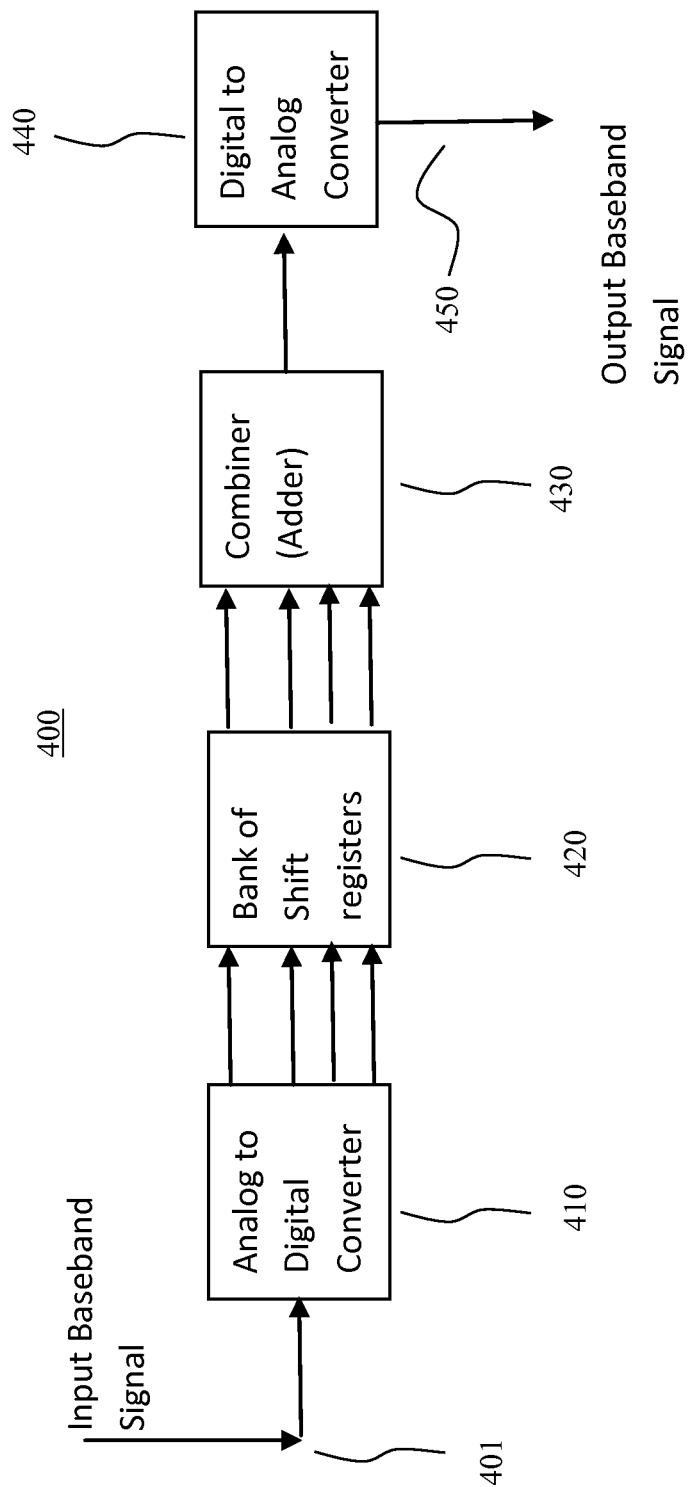
FIG. 4 is a block diagram showing an exemplary hardware configuration that can be used to implement the rotational coding scheme in accordance with the present principles.

Referring to FIG. 4, a hardware configuration 400 is disclosed for use with the rotational coding scheme. Upon reception of an input baseband signal 401, the node forwards the signal to the analog to digital converter 410. The analog to digital converter 410 outputs q-ary symbols where each element belongs to the finite field $F(p^n)$. The outputted symbols are forwarded to a bank of shift registers 420 which are used to buffer the incoming symbols. As mentioned previously, a set of unique keys are designed and assigned to each node. These keys will determine how the contents of the shift registers 420 are rotated and merged at the combiner 430. After the contents of the shift registers 420 have been rotated and combined, the digital to analog converter 440 will permute back the combined contents to generate the output baseband signal 450.

Having described the rotational coding scheme with references to FIGS. 1-4, a more detailed description of the present invention will now be provided. First, the network model and relevant notations are described. Next, a more detailed explanation of the rotational coding scheme for a generic node $\Phi_k$ is provided along with the relationship between the coding performed at different nodes. In this section, the application of the rotational coding scheme is discussed in the context of both layered and acyclic networks. A random linear network coding scheme is also disclosed which is based on the Markov chain properties of the underlying wireless network model. The method directly deals with general acyclic networks and is relatively short and simple. Finally, it is shown that the cutset bound for a single multicast in a half-duplex network can be achieved using the network coding techniques of the preceding sections.

In one embodiment of the present invention, a wireless network is considered as a directed graph where each node can transmit the same message through all outgoing links and receive the superposition of the signals arrived from the incoming links. A deterministic approach is used to model the gain of the links and how the superposition is performed. For the discussion below, it should be assumed that all nodes are full-duplex (i.e. they can simultaneously transmit and receive data), except towards the end where the achievability of the cutset bound is studied for half-duplex networks (i.e. networks that cannot receive while transmitting information). Therefore, the issue of scheduling transmissions in network nodes is irrelevant.

For the purposes of the description below, it is further assumed that the network includes 1+N nodes, where one of them is the source of a multicast session and the rest of the nodes are relay nodes or terminal nodes of the session. A universal index k is used for every node $\Phi_k$ where k=0,1, ... N.

In the deterministic channel model which has been adopted, the output signal from node $\Phi_k$ at time-slot t is considered as a column vector $y_t^k = [y_{t,1}^k, y_{t,2}^k, \ldots, y_{t,q}^k]\dagger$ of size q, where each element is a value in Galois Field $F(p^n)$ for some prime number p and positive integer n. Here, the symbol $\dagger$ is used to denote the matrix transpose operation. Each link from the node $\Phi_i$ to $\Phi_k$ in the network is denoted by its transfer function $G_i^k$ which is a q×q matrix with the entries in $F(p^n)$. The output of this link is equal to $G^k y_t^i$. The received vector or input at the node $\Phi_k$ is a column vector $x_t^k = [x_{t,1}^k, x_{t,2}^2 \ldots, x_{t,q}^k]$ which is the superposition of the outputs of the links arriving at node $\Phi_k$ defined on component-by-component basis, i.e., $$x_t^k = \sum_{i=0}^{n} G_i^k y_t^i \qquad (1)$$

where $G_i^k$ is the transfer function when there is an outgoing link from $\Phi_i$ to $\Phi_k$. Otherwise, it is set to q×q matrix 0. If the received vectors at multiple nodes $\Phi_k$, k ∈ B={$j_1, \ldots, j_b$} are stacked together, assuming they are characterized by the output at the nodes $\Phi_k$, k ∈ A={$i_1, \ldots i_a$} (i.e. all incoming links of B originated in A), then the transfer function is given by:

$$\begin{bmatrix} x_t^{j_1} \\ x_t^{j_2} \\ \vdots \\ x_t^{j_b} \end{bmatrix} = \begin{bmatrix} G_{i_1}^{j_1} & G_{i_2}^{j_1} & \ldots & G_{i_a}^{j_1} \\ G_{i_1}^{j_2} & G_{i_2}^{j_2} & \ldots & G_{i_a}^{j_2} \\ \vdots & & & \vdots \\ G_{i_1}^{j_b} & G_{i_2}^{j_b} & \ldots & G_{i_a}^{j_b} \end{bmatrix} \begin{bmatrix} y_t^{i_1} \\ y_t^{i_2} \\ \vdots \\ y_t^{i_a} \end{bmatrix} = G_A^B \begin{bmatrix} y_t^{i_1} \\ y_t^{i_2} \\ \vdots \\ y_t^{i_a} \end{bmatrix} \qquad (2)$$

The time-frame operations for linear network coding schemes should also be considered. In all proposed coding schemes discussed below, it is assumed that each node performs a linear operation over a time frame of T time-slots, i.e., after receiving T vectors $x_t^k$, t=mT+1, ..., mT+T at time-frame m, the node $\Phi_k$ linearly maps qT received symbols by a matrix $F_m^k$ of size qT×qT to find qT new symbols which are outgoing symbols. Then, puts these symbols into T column vectors $y_t^k$, t=(+1)T+1, ..., (m+1T=T) that will be transmitted in the next T time-frame (time-frame m+1). The linear operation can be formulated as:

$$\begin{bmatrix} y^k_{(m+1)T+1,1} \\ \vdots \\ y^k_{(m+1)T+T,1} \\ y^k_{(m+1)T+1,2} \\ \vdots \\ y^k_{(m+1)T+T,2} \\ \vdots \\ y^k_{(m+1)T+T,q} \end{bmatrix} = F^k_m \begin{bmatrix} x^k_{(m+1)T+1,1} \\ \vdots \\ x^k_{(m+1)T+T,1} \\ x^k_{(m+1)T+1,2} \\ \vdots \\ x^k_{(m+1)T+T,2} \\ \vdots \\ x^k_{(m+1)T+T,q} \end{bmatrix} \quad (3)$$

The above vectors corresponding to outgoing symbols at time-frame m+1 and incoming symbols at time m of node k are denoted by $Y_{(m+1)}^k$ and $X_m^k$ respectively.

Let $H_A^B = G_A^B \otimes I$ where $\otimes$ is the Kronecker matrix product and I is a T×T identity matrix. Hence, $$X_m^k = \sum_{i=0}^{n} H_i^k Y_m^i \quad (4)$$

In this sub-section, assume that the wireless network is layered, i.e., the nodes are divided into L+1 layers namely layer 0, 1, ..., L such that the input for any node in layer l+1 depends on the output of the nodes in layer l and the transfer function of the links from the nodes in layer l to the nodes in layer l+1. There exists exactly one node in layer 0 which is the source node of the single multicast session.

For layered networks, set matrices $F_m^k$ based on only the node index number k (independent from time-frame number m). The structure of layered network implies that at time-frame M+1 the nodes of layer l receive a linear combinations of symbols which have been sent by the source at time-frame m. In other words, the symbols which are sent at different time-frames are not mixed at any node.

Since every node performs a linear transformation there will be a linear mapping between the symbols sent from the source $\Phi_0$ and symbols received by an arbitrary node. Denote this linear transformation that maps input symbols of $\Phi_0$ to an arbitrary node $\Phi_i$ in layer l by $S_i$. Hence, $$X_{m+1}^i = S_i X_m^0 \quad (5)$$

for all time-frames m. Now, consider a node $\Phi_k$ in layer l+1. $S_k$ can be written in terms of matrices of $F_i$ and $H_i^k$ of nodes in layer l as following:

$$S_k = \sum_{i \in layer\, l} H_i^k F_i S_i \quad (6)$$

$$= \sum_{paths\ from\ i_0=0\ to\ i_l=k} o \prod_{j=0}^{l} H_{i_j}^{i_{j+1}} F_{i_j} \quad (7)$$

Note that (7) is obtained by repeating (6) for layers l-1, l-2, ..., 0.

Assume that the source selects its input vector from a vector space $V_o = F(p^n)^{qT}$. For an arbitrary set of nodes $A = \{i_1, i_2, \ldots, i_a\}$ in layer l, define Null (A) as the subspace of $F(p^n)^{qT}$ which is mapped to 0 in all nodes of A. In other words, $$Null(A) = \{X \in F(p^n)^{qT} : \forall k \in A, S_k X = 0\} \quad (8)$$

Denote the largest subspace of $F(p^n)^{qT}$ orthogonal to A by $V_A$ and call it "decodable space" by the set A. Given the received vectors of the nodes of A, it can be uniquely determined which vector in $V_A$ is sent by the source l time-frames earlier.

Denote the set theoretic difference of two sets A and B, also called the relative difference of A from B by $A/B = A \cap B^c$. The same operator is used to denote the extended quotient space of two vector spaces $V_A$ and $V_B$ as $V_A \setminus V_B$, which is defined as the largest subspace of $V_A$ that is orthogonal to $V_B$. The same operator may be applied to any two matrices, say, $G_1$ and $G_2$ as $G_1 \setminus G_2$ to denote the extended quotient space between the two vector spaces formed by the span of the column vectors of $G_1$ and $G_2$.

In view of the foregoing, it can be seen that the symbols which are sent at different time-frames in a layered network are not mixed at any node. However, this is not generally true for acyclic networks. For acyclic networks, the coding scheme cannot be considered as a linear mapping of the symbols which have been sent in a time-frame earlier. Therefore, a "code-block" structure is used for handling this issue and reusing the framework in analytical proofs. Accordingly, denote K consecutive time-frames as a code-block, where K is a large number.

Assume that L is the length of longest path in the network that starts from the source of the single multicast session. In coding schemes for acyclic networks, set the symbols of the last L time-frames of every block equal to zero. Then, the information symbols which are sent at different blocks will not be mixed at any node. Similar assumptions regarding layered networks can be made about the definitions of decodable space. However, code-blocks are used in this scenario instead of time-frames.

A "rotational linear coding" scheme can be implemented on the above-described network model. The coding scheme can be used for a variety of different network coding applications in both wireless and wired networks. This coding scheme for a generic node $\Phi_k$ depends on some parameters referred to as "keys." The keys are chosen such that the interaction between the different nodes leads to maximization of the rank of the decodable space at any subset of nodes.

Referring to FIG. 5A, an exemplary network is provided to demonstrate how the linear operation achieves maximum throughput. Node $\Phi_0$ represents a source node which is transmitting information to destination nodes $\Phi_3, \Phi_4, \Phi_5$. Nodes $\Phi_1, \Phi_2$ are intermediary nodes which serve to forward information from the source node to the destination nodes. Note that the network in FIG. 5A is a layered network where $l_1 = 2$ and $G_0^1 = G_0^2 = I$, also $l_2 = 3$, and $G_1^3 = G_1^4 = G_2^4 = G_3^5 = I$, where I is an identity matrix of size q. The same coding at the nodes $\Phi_1, \Phi_2$ in layer one will lead to no information reception at node $\Phi_4$ while, in fact, it should be possible to send full rank q information to all three nodes $\Phi_3, \Phi_4, \Phi_5$ simultaneously. This very same example on F(2) with q=1 also shows that it is impossible to achieve the full rank transmission to all three nodes in layer two, if the coding is performed at the symbol level, i.e, T=1, rather than over a block of T symbols. However, T=2 can solve the problem.

Another exemplary network is disclosed in FIG. 5B. The network depicted in FIG. 5B shows that for any finite number T, there exists a network that needs a time-slot $T^1 > T$ for the linear mapping (F) of the nodes to achieve the multicast capacity. In the network topology of FIG. 5B, the transfer functions of the links from the source to all η nodes in layer one are equal to G=I. There are $\binom{\eta}{2}$ nodes in layer two where each one corresponds to exactly two nodes in layer one. For each node in layer two, there are two links from its two corresponding nodes in layer one with transfer functions equal to I and I. If the corresponding two nodes in layer one have the same output, then the node in layer two will receive 0 as the superposition of received signals (i.e. it will not be able to decode the multicast messages). If a network is considered where $\eta > (p^n)^{T2}$, and it is assumed that the linear mapping of the nodes (F) is a T×T matrix, then the linear mapping of at least two nodes in layer two will be the same and they will have equal outputs. Hence, their corresponding node in layer two will always receive zero.

Consider a different example where the rotational coding scheme is applied in the context of layered networks. To generate and assign key values for the various nodes (for example, as in block 230 of FIG. 2), key $f_{i,j,k}$ is defined in layered networks to be an integer associated with the $j^{th}$ element of the received vector and $i^{th}$ element of the transmitted vector by node $\Phi_k$. Thus each node has $q^2$ keys. The coding at node $\Phi_k$ is performed as follows. Let the rotation of a vector, say $\tilde{x}_j^k$, by the integer value s be defined as $\tilde{x}_j^k\{s\} = [x_{s+1,j}^k, x_{s+j,2}^k, \ldots, x_{T,j}^k, x_{2,j}^k, \ldots, x_{s,j}^k]\dagger$. Using the set of keys $f_{i,j,k}$, the vector $\tilde{y}_i^k$ is obtained as:

$$\tilde{y}_i^k = \sum_{j=1}^{q} \tilde{x}_j^k \{f_{i,j,k}\} \quad (9)$$

The linear operation matrix $F_m^k$ of node $\Phi_k$ can be obtained from (9) as:

$$\begin{bmatrix} \tilde{y}_1^k \\ \tilde{y}_2^k \\ \vdots \\ \tilde{y}_q^k \end{bmatrix} = \begin{bmatrix} I\{f_{1,1,k}\} & I\{f_{1,2,k}\} & \cdots & I\{f_{1,q,k}\} \\ I\{f_{2,1,k}\} & I\{f_{2,2,k}\} & \cdots & I\{f_{2,q,k}\} \\ \vdots & \vdots & \cdots & \vdots \\ I\{f_{q,1,k}\} & I\{f_{q,2,k}\} & \cdots & I\{f_{q,q,k}\} \end{bmatrix} \begin{bmatrix} \tilde{x}_1^k \\ \tilde{x}_2^k \\ \vdots \\ \tilde{x}_q^k \end{bmatrix} = F_m^k \begin{bmatrix} \tilde{x}_1^k \\ \tilde{x}_2^k \\ \vdots \\ \tilde{x}_q^k \end{bmatrix} \quad (10)$$

where the rotation for the matrices If $\{(.,.,.)\}$ are defined similar to the rotation for a column vector by rotating the rows of the matrix. Relating back to FIG. 2, equations (9) and (10) represent the rotation taking place in block 246.

As mentioned above with respect to block 230 of FIG. 2, keys should be chosen such that the interaction between different nodes leads to maximization of the rank of the decodable space at any subset of nodes. One proper choice of the keys is as follows. Enumerate all possible choices of the keys and assign each pair (i, j, k) a unique number $e_{i,j,k}$ between 1 and $q^2 \times$(number of nodes in the network). Define $f_{i,j,k} = (q+1)^{e_{i,j,k}}$. It can be verified that for any two disjoint subsets of $(i, j, k) \in Z_1$ and $(i, j, k) \in Z_2$, there is $$\sum_{(i,j,k)\in=1} \alpha_{i,j,k} \cdot f_{i,j,k} \sum_{(i,j,k)\in=2} \alpha_{i,j,k} \quad (11)$$

where $\alpha(.,.,.) \in \{1, 2, \ldots, q\}$. T is chosen very large to compare to the values of $f_{i,j,k}$.

When the keys are selected as above, then the linear operation matrix F will have some important properties that will be described in Lemma 1 and Lemma 2 below.

Lemma 1: Let E be a rT×rT, r≦q sub-matrix of F by selecting any arbitrary r block columns and r block rows from the block matrix F. Then, the rank of E is rT−o(T) i.e., the rank of E is "almost" rT as T→∞.

The consequence of Lemma 1 is that by observing a restricted set (only some components of the space) from the output of the node and knowing the space of the input of the node, it is possible to almost uniquely determine the input. In Lemma 2, more generally, it is assumed that F can transfer the maximum amount of information from input space of the node to output links.

Lemma 2: Consider an arbitrary link from node $\Phi_k$ to $\Phi_j$. Then, $$|H_k^j F_k S_k| = \min(T|G_k^j|, |S_k|) - o(T) \quad (12)$$

Lemma 2 shows that $F_k$ can transfer the maximum amount of information from input space and output space of the links.

Note that the keys of each node were chosen independent from the time-frame number m in layered networks. However, as explained in further detail later on, the keys are selected in acyclic networks also based on the time-frame number (m) in every code-block.

A discussion of the theorem of rank inheritance in layered networks is appropriate. A description is provided of three theorems on the maximum rate of information which can be sent from a source to any set of nodes in a layered network.

First, consider a simple case where the network has only two layers. The first layer is the source node and the second layer includes the rest of the nodes. This corresponds to a single hop broadcast network. Theorem 1 provides a bound on the dimension of the space seen by any set of nodes in this network.

Theorem 1 (Broadcast Theorem): Consider a single node $\Phi_1$ (i.e., A={i}) broadcasting information to a set of nodes $\{\Phi_k\}_{k\in B}$, B={$j_1, \ldots, j_b$}. The maximum dimension of the decodable space of B is $$|V_B| = \min(|V_i|, |H_A^B|) \quad (13)$$

The maximum dimension of decodable space in (13) can almost be achieved using the rotational coding scheme. According to Theorem 1, a unique coding scheme can simultaneously achieve the rank in (13) for any arbitrary subset of the nodes. This is the reason for using the terminology of the inherited rank for the nodes in the second layer from the rank of the nodes in layer one. The inherited rank depends on the network topology, i.e., the channel matrices, and also the coding scheme. Nonetheless, rotational coding scheme achieves the maximum possible rank for any arbitrary network topology.

As explained in further detail below with regard to describing the random rotational coding scheme in acyclic networks, codes are created independent of the transfer functions $G_l^k$ (i.e., forward channel knowledge). As a consequence, if a node $\Phi_1$ broadcasts to multiple destinations, the inherited rank for each destination follows (13), simultaneously.

Theorem 2 provides a fundamental bound on the dimension of decodable space which a set of nodes in layer l+1 can obtain from another set of nodes in layer l. This is a generalization of Theorem 1 where the first layer has only one node. For example, consider two nodes $\Phi_1$ and $\Phi_2$ in layer one and two nodes $\Phi_3$ and $\Phi_4$ in layer two. Hence, $$|V_3| = \min(|V_{1,2}|, |V_1| + |H_2^3|, |V_2| + |H_1^3|, |H_{1,2}^3|), \quad (14)$$

$$|V_4| = \min(|V_{1,2}|, |V_1| + |H_2^4|, |V_2| + |H_1^4|, |H_{1,2}^4|), \quad (15)$$

$$|V_{3,4}| = \min(|V_{1,2}|, |V_1| + |H_2^{3,4}|, |V_2| + |H_1^{3,4}|, |H_{1,2}^{3,4}|), \quad (16)$$

Theorem 2 (Rank Inheritance Theorem): Consider a bipartite graph which is the part of the network described above between two layers. Consider a subset of transmitting nodes $\{\Phi_k\}_{k\in A}$, A={$i_1 \ldots i_a$} sending information to the subset $\{\Phi_k\}_{k \in B}$, $B=\{j_1 \ldots j_b\}$ in the receiving nodes. The maximum rank that space $V_A$ inherits from the space $V_B$ is:

$$|V_B| = \min_{\Theta \subseteq A} (|V_\Theta| + |H_{A\setminus\Theta}^B|) \quad (17)$$

and this can be (almost) achieved using the rotational coding scheme.

Denote the set of cutsets between the source and a terminal node $k_i$ by $\Lambda_{ki} = \{\Omega : \Omega \subset \{0, 1, \ldots, N\}, 0 \in \Omega, N \in \Omega^c\}$ and define minimum cutset rank between the source and the destination as:

$$r_{min} = \min_{k_i \in terminals} \min_{\Omega \in \Lambda k_i} \{|G_\Omega^{\Omega^c}|\} \quad (18)$$

If the multicast session includes more than one terminal, then define $r_{min}$ as the minimum value among the minimum cutset ranks of different terminals.

Theorem 3 (Achievability Theorem in Layered Networks): Assume a single multicast session in a layered wireless network and define $r_{min}$ as (45). The rate of $R=n \log_2(p)r_{min}(1-o(T)/T)$ can be achieved using rotational coding scheme. In this situation, the achievable rate becomes equal to minimum cutset bound of the multicast session as $T \to \infty$.

Having described the three theorems for maximizing the rate of information which can be sent from a source to any set of nodes in a layered network, Theorem 4 is presented to show how the rotational coding scheme can achieve the minimum cutset bound in acyclic networks. In acyclic networks, the time-frame number m is added for computing the linear operation matrix $F_m^k$ and the keys are defined as $f_{i,j,k,m}=(q+1)^{e_{i,j,k,m}}$ where $e_{i,j,k,m}$ is a unique natural number for i, j=1, 2, ..., q and k=1, 2, ..., N, and m=1, 2, ... K-L keys for the nodes based rotational coding scheme at each node for transforming the received frame of size T to the output frame.

Theorem 4 (Achievability Theorem in Acyclic Networks): Assume a single multicast session in a acyclic wireless network and define $r_{min}$ as (45). The rate of $R=n \log_2(p)[K-Lr_{min}(T-o(T))-qT]/(KT)$ can be achieved using extended rotational coding scheme. Hence, the achievable rate is equal to the minimum cutset bound of the multicast session when $K, T \to \infty$.

Theorem 4 shows that there exists a linear random coding scheme that works independent of topology of the networks and destinations, and that the rate of information which it can carry from the source to any arbitrary destination is (almost) equal to minimum cutset bound between the course and the destination.

Having described the above rotational coding scheme, a random linear coding scheme for an acyclic rotational wireless network is presented which can achieve the well-known cutset upper bound in the network.

As explained above in the description of the network model, the source sets the vectors which are sent in the last L frames of each block to zero. It is assumed that the vectors of first K-L frames are taken from a vector space $V_0 \subseteq F(p^n)^{qT}$.

The coding scheme is a linear mapping where each terminal receives some linear combinations of qT(K-L) symbols which are sent by the source at each block during KT uses of channel, and then the terminal computes the transmitted symbols by the source using an inverse linear mapping.

Theorem 5 shows that the random linear coding scheme can achieve the minimum cutset bound of the single multicast session asymptotically as $T, K \to \infty$.

Theorem 5: Assume a single multicast session in an acyclic wireless network and define $r_{min}$ as (18). The rate of $n \log_2(p)[T(K-L)r_{min}-N(K-L)/n \log_p(2)]/(KT)$ can be achieved using an extended random coding scheme. Therefore, the achievable rate is equal to the minimum cutset bound of the multicast session when $K, T \to \infty$.

In all of the descriptions provided above, it was assumed that the nodes in the network were full-duplex. However, the discussion provided below describes the maximum throughput of a single multicast session under a practical assumption that the wireless nodes are half-duplex (i.e., they cannot transmit and receive simultaneously. Moreover, it is shown how the cutset bound for the throughput of the multicast session can be found and a new coding scheme is presented which can achieve the cutset bound. This coding scheme based on the earlier coding schemes described above.

In half-duplex network model, a scheduling scheme for the transmissions (and receptions) of the nodes is needed in order to transport information in the network. Obviously, the throughput of the network depends on this scheduling scheme, in addition to other factors (e.g., network topology), which affect the throughput in full-duplex model.

One method for computing a cutset bound on the throughput of half-duplex wireless network involves the consideration of every set of simultaneous transmissions $\Theta_s \subseteq \{\Phi_0, \Phi_1, \ldots \Phi_N\}$ has a state for the network. Clearly, the number of states is equal to the number of subsets of the nodes which is $2^{N+1}$.

Any arbitrary scheduling scheme that transports the information between some nodes can be considered as a set of states of the network where each state is used in some particular periods of time. For any given scheduling scheme, "time-proportion" parameters $\tau_1, \ldots, \tau_{2N+1}$ are defined as the fraction of time where the scheduling scheme is at state $\Theta_1, \ldots, \Theta_{2N+1}$ respectively. Define the time-proportion $$\tau_s = \lim_{T \to \infty} \frac{T_s}{T}$$

for $s+1, \ldots, 2^{N+1}$ where $T_s$ is the total duration of time in time interval [0,T] that the network is at state s. Note that the time-proportions can be defined only for those scheduling schemes where the above limit converges. The convergence exists for any periodic scheduling scheme. Then, the cutset bound can be found for any given scheduling scheme based the time-proportions. In Lemma 3, the scenario is simplified for one source and one destination case, and the channel model described above is also assumed.

Lemma 3: Assume a scheduling scheme with time proportions $\tau_1, \ldots, \tau_{2N+1}$ The rate of information (R)) that can be sent from a node $\Phi_0$ to a node $\Phi_{k_i}$ is bounded as:

$$R \leq \min_{\Omega \in \Lambda k_i} \left\{ \sum_{s=1}^{2N=1} \tau_s \cdot n \log_2(p) \left| G_{(\Omega-\Theta_s)}^{\Omega^c-\Theta_s^c} \right| \right\} \quad (19)$$

where $\Lambda_{ki}$ denotes the sets of cutsets between $\Phi_0$ and $\Phi_{k_i}$.

Note that in (19), the value of $$n\log_2(p)\left|G_{(\Omega\cap\Theta_s)}^{\Omega^c\cap\Theta_s^c}\right|I$$

is the maximum rate of information which can be sent from the set $\Omega$ to $\Omega^c$ assuming that the network is at state s where the nodes of $\Theta_s$ are in transmission mode and the nodes of $\Theta_s^c$ are in reception mode.

Equation (19) can be slightly changed to generalize the computed cutset bound for multicast case. Here, the minimum cutset among all terminals is found for any given scheduling scheme.

Lemma 4: Assume a scheduling scheme with time proportions $\tau_1, \ldots, \tau_{2N+1}$. Consider a multicast session from a source node $\Phi_0$ to a set of terminals $\Gamma=\{k_1 \ldots, k_d\}$. The maximum rate of information which can be sent from the source to all terminals(R) is bounded as $$R \le \min_{\Theta_{ki}\in\Gamma}\left[\min_{\Theta\in\Lambda_{ki}}\sum_{s=1}^{2N=1}\tau_s\cdot n\log_2(p)\left|G_{(\Omega-\Theta_s)}^{\Omega^c-\Theta_s^c}\right|\right] \quad (20)$$

where $\Lambda_{ki}$ denotes the set of cutsets between $\Phi0$ and $\Phi_{ki}$.

It should be noted that in the half-duplex network model, the same values of $\tau_1, \ldots, \tau_{2N+1}$ might not maximize (19) when the terminal node $\Phi_N$ of the network is varied. Notice that in contrast with full-duplex network model, if a multicast session which has more than one destination is considered in half-duplex model, the minimum cutset bound cannot be computed only by finding the cutset bounds between the source and each destination separately. This principle is illustrated by the exemplary network in FIG. 5C.

Referring to FIG. 5C, an example of a half-duplex network is disclosed where the minimum cutset for two terminals is smaller than the minimum cutset toward each terminal separately. Assume that the transfer functions of all links in this network are I. It can be shown that the source node $\Phi_0$ can unicast information to the terminal $\Phi_3$ with maximum rate of $5/6qn\log_2(p)$. In order to achieve this rate, the links $\Phi_0\Phi_1$ and $\Phi_0\Phi_2$ should be used $\frac{1}{2}$ and $\frac{1}{3}$ fraction of time respectively. Similarly, the maximum rate for unicasting information from $\Phi_0\Phi_5$ is equal $5/6qn\log_2(p)$. To achieve this rate, the links $\Phi_0\Phi_2$ and $\Phi_0\Phi_3$ should be used $\frac{1}{2}$ and $\frac{1}{3}$ fraction of time respectively. Note that $\Phi_0$ cannot send information to both terminals at the rate of $5/6qn\log_2(p)$ because $\Phi_0\Phi_2$ should be used at different fractions of time.

Theorem 6 shows that the minimum cutset bound computed in Lemma 4 can be achieved in half-duplex acyclic wireless networks.

Theorem 6 (Achievability Theorem for Half-duplex): Assume there is a single multicast session in a half-duplex acyclic wireless network with a given scheduling scheme. Then, there exists a coding scheme to achieve the minimum cutset bound of the multicast session, given in (20). Corollary 1 is a logical extension of Theorem 6.

Corollary 1: The maximum rate of information which can be sent from the source of a single multicast session $\Phi_0$ to a set of terminals $\Gamma=\{\Phi_{ki}, \ldots, \Phi_{kd}\}$ in an acyclic wireless network is:

$$R = n\log_2(p)\sum_{\tau_s=1}^{max}\left\{\min_{\Phi_{ki}\in\tau}\left[\min_{\Omega\in\Lambda i}\sum_{s=1}^{2N+1}\tau_s\left|G_{(\Omega-\Theta_s)}^{\Omega^c-\Theta_s^c}\right|\right]\right\} \quad (21)$$

where $\tau_s$ is the fraction of time that the network is at state $\Theta_s$, and $\Lambda_{ki}$ denotes the set of cutsets between $\Phi_0$ and $\Phi_{ki}$.

In Corollary 1, the maximum throughput is computed of a single multicast session in an acyclic wireless network. The bound can be found by optimizing the time proportions of different states of the network, and then computing the minimum cutset bound. The minimum cutset bound can be achieved for any given time proportions of the states.

Having described preferred embodiments of a rotational coding scheme in wired and wireless networks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for implementing a network encoding scheme, comprising the steps of:
    buffering at least one received signal by a node of a plurality of nodes of a network;
    wherein said buffering comprises buffering the at least one received signal in a quantized form at the node of the network;
    rearranging the received signal in a certain order into q blocks;
    rotating each of the rearranged q blocks with a rotation value;
    wherein the rotation value is derived by at least one key which has been assigned to each of the plurality of nodes of the network;
    combining the rearranged rotated blocks together to generate at least one output block;
    generating one output signal for each of the q blocks by rearranging the at least one output output block in quantized form;
    a source node selecting codewords to be transmitted to destination nodes;
    the source node then selecting a particular location of the codewords to be transmitted to send pilot signals that are known to the destination nodes;
    forwarding the output signal to a destination node; and
    wherein the destination nodes which have knowledge of all the assigned keys and the location of pilot signals, as well as the network topology, decode the received signals using the pilot signals and the assigned key.

2. The method of claim 1, wherein the at least one key is generated by a source node which assigns at least one key to each node of a network.

3. The method of claim 1, wherein the at least one key is generated at each node using a given method and identifier which is unique to each node.

4. The method of claim 1, wherein the node is a half-duplex node and the method further comprises scheduling a reception and a transmission of the at least one signal.

5. The method of claim 1, wherein a plurality of output signals are generated.

6. the method of claim 1, wherein the node has a plurality of outgoing channels and/or a plurality of component channels each of which is assigned a unique key.

* * * * *